United States Patent
Apker et al.

(10) Patent No.: US 10,527,720 B2
(45) Date of Patent: Jan. 7, 2020

(54) MILLIMETER-WAVE TERRAIN AIDED NAVIGATION SYSTEM

(71) Applicant: The Government of the United States of America, as represented by the Secretary of the Navy, Arlington, VA (US)

(72) Inventors: Thomas Apker, Alexandria, VA (US); Christopher T. Rodenbeck, Annandale, VA (US); Thomas Pizzillo, Dunkirk, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 115 days.

(21) Appl. No.: 15/845,067

(22) Filed: Dec. 18, 2017

(65) Prior Publication Data

US 2018/0172821 A1 Jun. 21, 2018

Related U.S. Application Data

(60) Provisional application No. 62/435,203, filed on Dec. 16, 2016.

(51) Int. Cl.
*B64C 39/00* (2006.01)
*G01S 13/89* (2006.01)
(Continued)

(52) U.S. Cl.
CPC ............ *G01S 13/89* (2013.01); *B64C 39/024* (2013.01); *G01C 21/005* (2013.01); *G01S 5/04* (2013.01);
(Continued)

(58) Field of Classification Search
CPC .......... G01S 13/00; G01S 13/86; G01S 13/89; G01S 13/9303; G01S 13/94; G01S 5/00; G01S 5/04; G01C 21/00; G01C 21/005; B64C 39/00; B64C 39/024; G05D 1/00; G08G 5/00; G08G 5/0008
See application file for complete search history.

(56) References Cited

U.S. PATENT DOCUMENTS 5,592,170 A * 1/1997 Price .................. F41H 11/16
                                                      342/22
5,663,720 A * 9/1997 Weissman ............... G01S 13/91
                                                      340/905

(Continued)

*Primary Examiner* — Yonel Beaulieu
(74) *Attorney, Agent, or Firm* — U.S. Naval Reach Laboratory; William P. Ladd

(57) ABSTRACT

Systems and method are provided for using millimeter-wave radar for terrain-aided navigation in support of autonomous guidance, landing, and mapping functions in all weather for unmanned air vehicles (UAVs). In an embodiment, a UAV can generate a map, based on millimeter-wave (MMW) radar returns, that rejects a large number of radar measurements as clutter and generates a flight path using waypoints based on the map. Embodiments of the present disclosure provide a means of correlating MMW radar returns with high resolution terrain maps to enable navigation in GPS-denied environments. This process significantly reduces cost, development time, and complexity when compared to conventional approaches.

20 Claims, 4 Drawing Sheets

(51) Int. Cl.
  *G01C 21/00* (2006.01)
  *G01S 13/86* (2006.01)
  *G05D 1/12* (2006.01)
  *G08G 5/00* (2006.01)
  *G08G 5/02* (2006.01)
  *G01S 13/94* (2006.01)
  *G01S 13/93* (2006.01)
  *G08G 5/04* (2006.01)
  *G05D 1/10* (2006.01)
  *B64C 39/02* (2006.01)
  *G01S 5/04* (2006.01)
  *G05D 1/00* (2006.01)
  *G01S 13/90* (2006.01)

(52) U.S. Cl.
  CPC .......... *G01S 13/86* (2013.01); *G01S 13/9303* (2013.01); *G01S 13/94* (2013.01); *G05D 1/0088* (2013.01); *G05D 1/101* (2013.01); *G05D 1/104* (2013.01); *G05D 1/12* (2013.01); *G08G 5/0008* (2013.01); *G08G 5/0021* (2013.01); *G08G 5/0052* (2013.01); *G08G 5/0069* (2013.01); *G08G 5/0078* (2013.01); *G08G 5/0086* (2013.01); *G08G 5/025* (2013.01); *G08G 5/045* (2013.01); *B64C 2201/141* (2013.01); *G01S 13/9064* (2019.05)

(56) References Cited

U.S. PATENT DOCUMENTS

| | | | |
|---|---|---|---|
| 2004/0141170 A1* | 7/2004 | Jamieson | G01S 7/4811 356/5.01 |
| 2008/0136704 A1* | 6/2008 | Chan | G01S 7/282 342/201 |
| 2009/0135046 A1* | 5/2009 | Steele | G01S 7/414 342/27 |
| 2016/0210863 A1* | 7/2016 | Kohn-Rich | G05D 1/0646 |
| 2018/0031695 A1* | 2/2018 | Carswell | G01S 13/9023 |
| 2018/0172821 A1* | 6/2018 | Apker | B64C 39/024 |
| 2019/0080142 A1* | 3/2019 | Abeywardena | G06K 9/0063 |

* cited by examiner

MILLIMETER-WAVE TERRAIN AIDED NAVIGATION SYSTEM

CROSS REFERENCE TO RELATED APPLICATIONS

This application claims the benefit of U.S. Provisional Patent Application No. 62/435,203, filed on Dec. 16, 2016, which is incorporated by reference herein in its entirety.

FIELD OF THE DISCLOSURE

This disclosure relates to unmanned aerial vehicles (UAVs), including navigation for unmanned aerial vehicles.

BACKGROUND

Accurate measurement of altitude (altimetry) is an important technology challenge for small unmanned aerial vehicles (UAVs). Accurate altimetry can be especially important for UAV operation in low altitude environments (e.g., to avoid collisions. Typical current solutions use global positioning satellite (GPS) positioning, which has poor accuracy in height and/or barometric sensors, which are crude in terms of both accuracy and precision. Many current and future applications for UAVs will involve operating near buildings, ships, and trees in all potential light and weather conditions, where global navigation satellite signals are unavailable, leading to the need for alternative altimetry solutions.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 1:
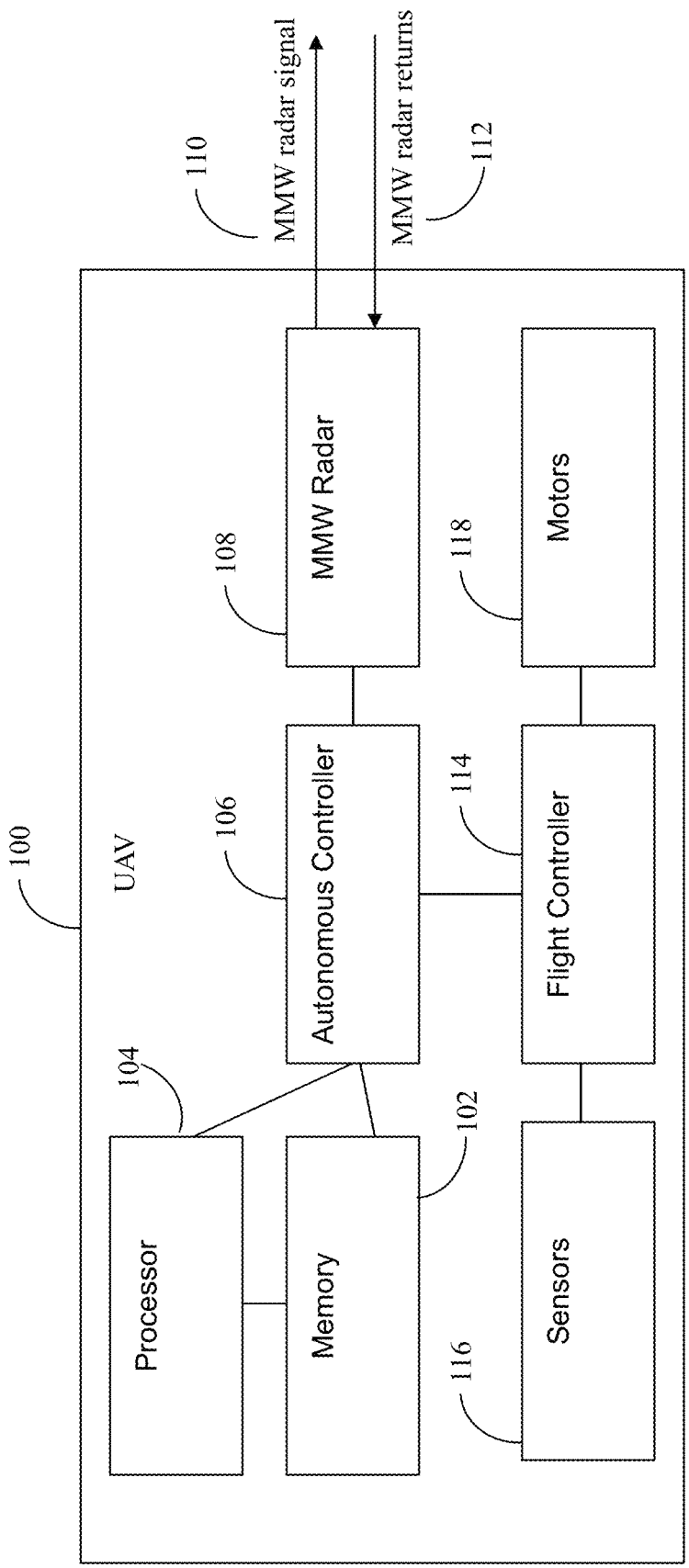
FIG. 1 is a diagram of an exemplary MMW radar device (e.g., a UAV) in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

Embodiments of the present disclosure use millimeter-wave radar for terrain-aided navigation in support of autonomous guidance, landing, and mapping functions in all weather for unmanned air vehicles (UAVs). Embodiments of the present disclosure enable autonomous operation at low altitudes in cluttered environments and provide a means of correlating millimeter-wave (MMW) radar returns with high resolution terrain maps to enable navigation in GPS-denied environments.

Embodiments of the present disclosure can generate a map that rejects a large number of radar measurements as clutter and generate a flight path using waypoints based on the map. Embodiments of the present disclosure provide a means of correlating millimeter-wave (MMW) radar returns with high resolution terrain maps to enable navigation in GPS-denied environments. This process significantly reduces cost, development time, and complexity when compared to conventional approaches.

2. RADAR ALTIMETERS

Current UAV altimeters have several disadvantages. Conventional radar altimetry uses a single, downward looking beam to collect a profile of the terrain below the aircraft as it flies over. This approach is not useful for collision avoidance or flight below the top of obstacles. Barometric approaches are not very accurate and are unreliable due to before and after pressure changes. Vision and LIDAR based navigation are limited to fair weather, cannot operate in smoke, and require more net power (e.g., transceiver plus processor). Simultaneous Localization and Mapping (SLAM) is not specific to radar and does not tolerate a high false-negative rate as is expected with MMW. Further, it requires log-odds calculation of cell occupancy (e.g., a detection increases the odds a cell is occupied and a beam passing through a point decreases the odds a cell is occupied). SLAM also leads to unstable numerical performance with noisy sensors (MMW radars are noisy when close to obstacles), and radar sensors can see multiple targets in a single beam as radio signals wrap around or pass through obstacles (which breaks occupancy grid assumptions and requires a new approach).

For radar altimeters, assuming a circular antenna illuminating a smooth earth, the diameter D of the spotlight projected by the radar onto the ground can be represented by the equation:

$$D = R\theta_{HP} = R\lambda/d \tag{1}$$

In Equation (1), R is the radar height, $\theta_{HP}$ is the half-power beam width, and d is the antenna baseline dimension. The radar cross section σ of the spotlight is $4\pi A^2/\lambda^2$, where A is the area of the spotlight. Using the diameter D from Equation (1) to calculate the radar cross section a gives the equation:

$$\sigma = 16R^4\lambda^2/d^4 \tag{2}$$

Referring to the classic radar Equation (1), the product of the antenna gains is proportional to $d^4$. Substituting Equation (2) into the radar equation therefore cancels all dependence on range/height R, wavelength λ, and antenna baseline dimension d. Thus, altimeter performance, measured in terms of SNR, is governed primarily by transmit power and integration time rather than by height above the ground or antenna size. For this reason, most altimeters operate at low microwave frequencies. In terms of resolution, however, for a given baseline dimension d, the spotlight predicted by Equation (2) should be much narrower for a millimeter-wave (MMW) altimeter due to the short wavelength λ, which should be a significant MMW advantage for rejecting clutter from bright scatterers on the ground and for correlating altimetry measurements to high-resolution maps for navigation in GPS-denied environments.

3. MMW RADAR ALTIMETERY

MMW radar devices in accordance with embodiments of the present disclosure provide altimetry solutions that address disadvantages of conventional devices. In an embodiment, a MMW radar capable device (e.g., a UAV or another MMW radar capable device) sends a signal, and the MMW radar returns are used to determine the height of obstacles in its field of view. Using the MMW radar returns, nearby terrain for trajectory planning and local navigation can be determined (e.g., based on generating a three dimensional (3D) image of nearby terrain). In an embodiment, the determined nearby terrain based on the MMW radar returns can be compared with digital terrain elevation data (DTED) for global navigation.

FIG. 1 is a diagram of an exemplary UAV 100 in accordance with an embodiment of the present disclosure. In an embodiment, UAV 100 includes a processor 104, a memory 102, an autonomous controller 106, a MMW radar 108, a flight controller 114, additional onboard sensors 116, and motors (e.g., to control UAV 100) 118. In an embodiment, MMW radar 108 is configured to generate MMW radar output signals 110 send. MMW radar 108 can receive MMW radar returns 112 corresponding to the sent MMW radar signals 110. In an embodiment, autonomous controller 106 can determine the validity of the MMW radar returns 112, project detections in the MMW radar returns over a 2D grid, determine maximum heights in area(s) of the 2D grid, and determined a plan (e.g., a flight path) to avoid obstacles based on the determined maximum heights.

It should be understood that UAV 100 can include additional components not shown in FIG. 1 (e.g., a power supply such as a battery, an antenna, propellers, etc.) Further, it should be understood that UAV 100 can be implemented using hardware, software and/or a combination of hardware and software in accordance with embodiments of the present disclosure. Components of UAV 100 (e.g., autonomous controller 106 and/or MMW radar 108) can be implemented using a single device or multiple devices in accordance with embodiments of the present disclosure and can also be implemented using hardware, software and/or a combination of hardware and software.

Figure 2:
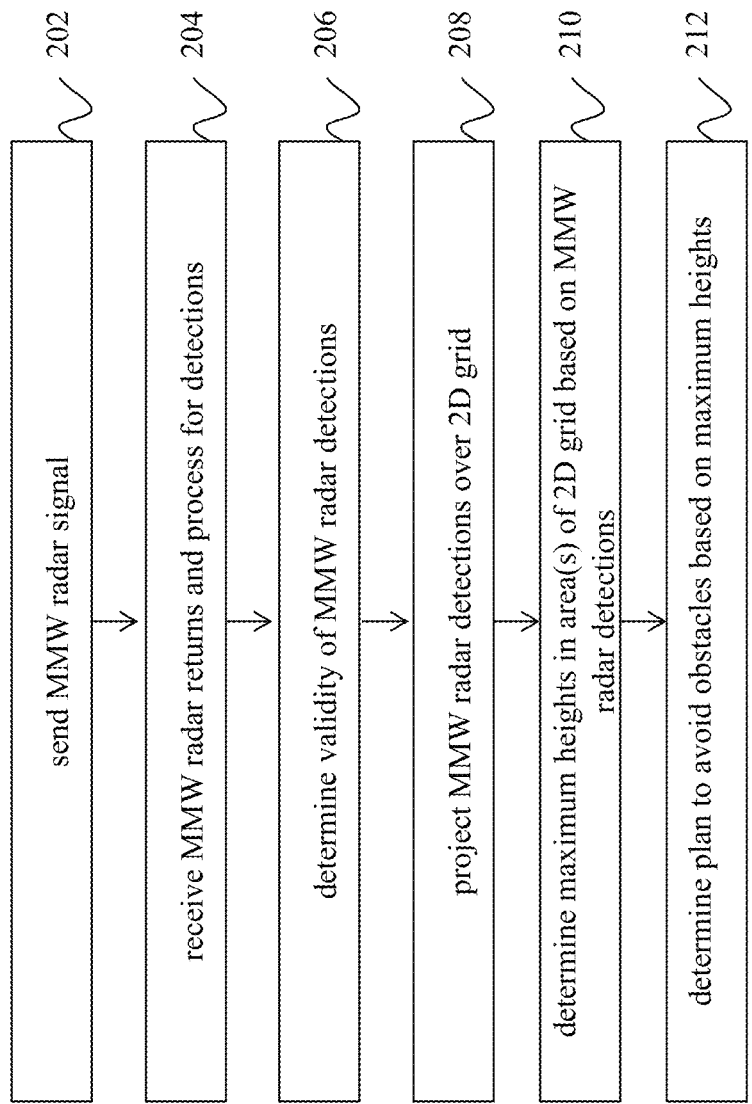
FIG. 2 is a flowchart of an exemplary method for altimetry using MMW radar returns in accordance with an embodiment of the present disclosure.

FIG. 2 is a flowchart of an exemplary method for altimetry using MMW radar returns in accordance with an embodiment of the present disclosure. In step 202, a MMW radar output signal 110 is sent (e.g., from autonomous controller 106 via MMW radar 108). In step 204, MMW radar returns are received (e.g., by MMW radar 108) and processed for detections (e.g., constant false alarm rate (CFAR) detections). In optional step 206, the validity of the MMW radar detections can be determined (e.g., by autonomous controller 106). For example, in an embodiment, signal outliers, clutter, and/or other signals known to be likely errors can be rejected. In step 208, the detections are projected over a 2D grid (e.g., using autonomous controller 106 and/or processor 104). In step 210, maximum heights of objects in each area of the 2D grid are determined based on the MMW radar returns 112. In step 212, a plan to avoid obstacles based on the maximum heights is determined (e.g., using autonomous controller 106 and/or processor 104).

UAVs using MMW radar for navigation in accordance with embodiments of the present disclosure have several advantages over UAVs using other navigation systems (e.g., GPS). For example, MMW radar can resolve obstacles with enough resolution to permit flight along the nap-of-the-earth at low altitude in addition to providing DTED-aided navigation. MMW radar is able to operate in all weather, including smoke, without significant performance loss and at lower net power (e.g., transceiver plus processor) than light-based navigation. Embodiments of the present disclosure can tolerate a high false-negative rate as is common with radars facing small targets in clutter such as tree tops. Embodiments of the present disclosure can scale to very large maps by using an octree representation instead of a fixed grid.

4. EXEMPLARY FLIGHT PATH

Figure 3:
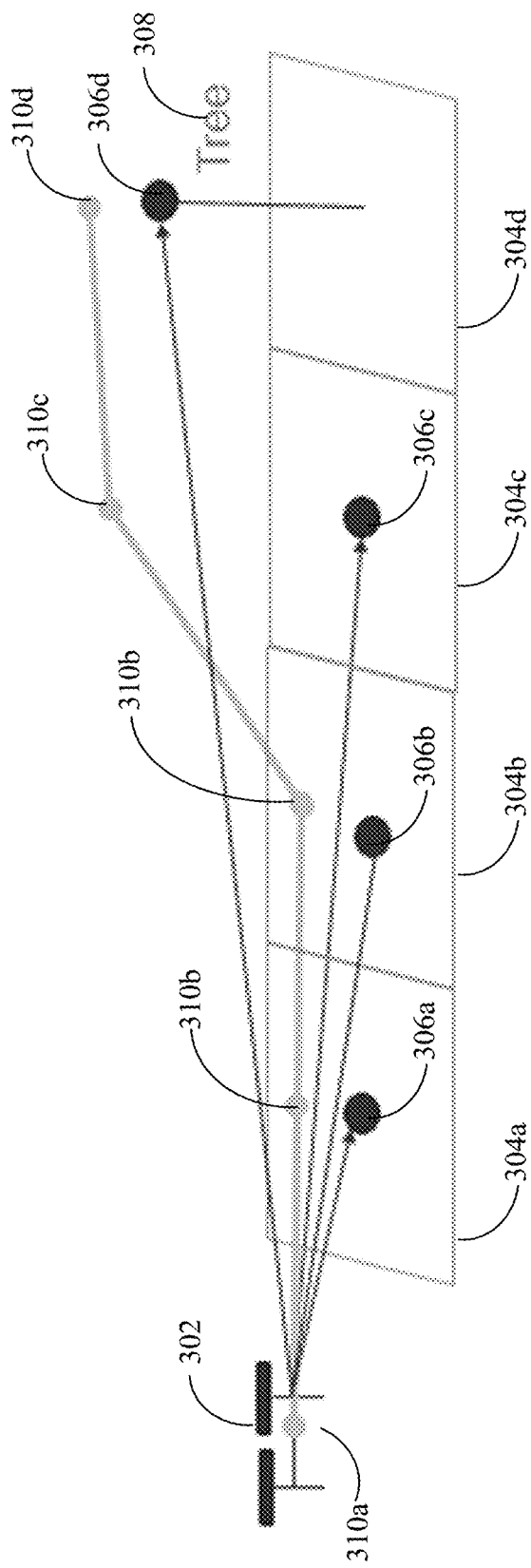
FIG. 3 is a diagram showing an exemplary flight path generated by a UAV in accordance with an embodiment of the present disclosure.

FIG. 3 is a diagram showing an exemplary flight path generated by a UAV in accordance with an embodiment of the present disclosure. In FIG. 3, a MMW radar capable UAV 302 sends one or more MMW radar signals to area(s) shown in cells 304 and receives a plurality of MMW radar returns. Based on these MMW radar returns (e.g., detections in the MMW radar returns), MMW radar capable UAV 302 determines maximum heights of objects in each cell 304, shown in FIG. 3 by dots 306. In an embodiment, height data can be stored in memory (e.g., memory 102). As shown in FIG. 3, cell 304d has a tree 308, so the maximum height for cell 304d is higher than that for cells 304a, 304b, and 304c. Based on this data, MMW radar capable UAV 302 plots a flight path along dots 310, gaining altitude at the end of the flight path to avoid tree 308.

For example, in an embodiment, MMW radar capable UAV 302 plots a trajectory a fixed height (in an embodiment, a user-configurable fixed height) above the determined maximum height 306 in each cell 304. In an embodiment, MMW radar capable UAV 302 can be configured to spread an altitude climb over two (or more) cells (e.g., cells 304c and 304d) in response to detecting a sudden change in terrain altitude (e.g., tree 308). In an embodiment, MMW radar capable UAV 302 can be configured not to descend if the top of the next cell is obscured.

In an embodiment, MMW radar capable UAV 302 can be configured to compare cells 304 with a probability of occupancy to DTED data for navigation. For example, if DTED data indicates a high probability of terrain elevation but the MMW radar returns do not indicate high elevation, MMW radar capable UAV 302 can be configured to operate at a higher altitude indicated by the DTED data for extra caution. Additionally, in an embodiment, terrain altitude profiles can be compared to DTED data for GPS-derived navigation.

5. EXEMPLARY MAP GENERATION AND WAYPOINT GENERATION

A challenge with creating a waypoint algorithm (e.g., a flight path along dots 310 in FIG. 3) is coupling the body-frame measurements of the radar system to the UAV navigation coordinates expressed in terms of latitude, longitude, and local pressure altitude. In an embodiment, a UAV (e.g., using autonomous controller 106) builds a radar map of the environment as the UAV flies and selects the height of the next waypoint based on the tallest object observed near each waypoint. This allows the algorithm to be split into two parts: (1) map generation and (2) waypoint generation.

In an embodiment, the first step in generating the map is to pass the radar data through a measurement filter that only accepts (1) elevation measurements between nadir and 10° above the radar's horizontal and (2) range measurements less than 30 m. This rejects a large number of radar measurements as clutter. In an embodiment, a map is initialized with a field of ones, indicating a minimum height of 1 m and spatial resolution of 2 m in the lateral (easting/northing) directions. A geodesic coordinate is computed for each detect passed by the valid measurement filter using UAV telemetry to determine a position in space. The grid cell corresponding to the easting/northing position of the detection is determined, comparing the height with the maximum previously recorded height in that cell. If the new detection height (or "z" value in an east-north-up coordinate frame) is greater than the current height, the height for that cell is set to the new value.

Figure 4:
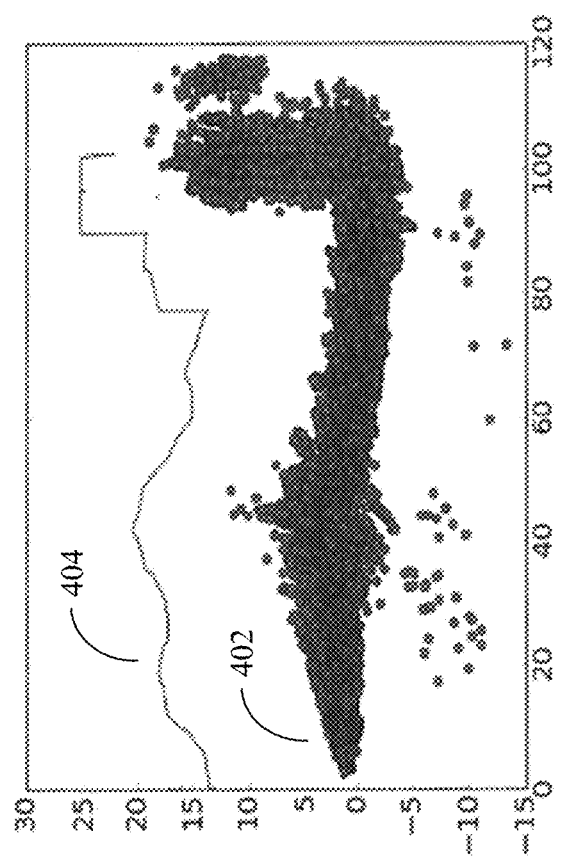
FIG. 4 is a diagram showing detects from MMW radar returns and a corresponding generated height profile in accordance with an embodiment of the present disclosure.

In an embodiment, waypoint generation is done in three steps: (1) coarse waypoint selection; (2) preflight waypoint generation; and (3) inflight waypoint update and transmit to the autopilot. In step (1), the UAV (or, e.g., another processing device configured to send commands to the UAV) determines the corners of the flight path (e.g., in an embodiment, points at which the UAV changes direction). In step 2, the paths between corners are segmented (e.g., into 6 m lengths) and stored as the "flown waypoints list" (FWL). In an embodiment, step 3 occurs during the flight and involves reading the map to generate the altitude for each waypoint. For example, step 3 can be implemented by updating the map at 1 Hz with an objective to maintain the aircraft height 10 m above the terrain or obstacles. In an embodiment, only a single waypoint from the FWL, called the "next" waypoint, 6 m ahead of the vehicle, is required for slowly varying altitudes. In an embodiment, the altitude of this next waypoint can be calculated using cells (e.g., nine cells) centered on this next waypoint. In an embodiment, the algorithm sends the following waypoint from the FWL when the vehicle is within 2 m of the next waypoint. FIG. 4 is a diagram showing detects from MMW radar returns and a corresponding generated height profile 404.

In an embodiment, two waypoints from the FWL are used when the altitude changes abruptly, such as when the vehicle encounters trees (e.g., as shown in FIG. 3). These waypoints are the "next" waypoint and the "second" waypoint, respectively. Two waypoints are used because information about the "second" waypoint can be unknown, either because the valid measurement filter prevents the map from updating or the radar cannot observe the second waypoint terrain, which is beyond the cause of the abrupt change in the "next" waypoint cell, i.e., a wall or trees. Embodiments of the present disclosure implement a fail-safe to avoid descending to a "second" waypoint with an unknown height. In an embodiment, the algorithm maintains the current height until it determines a new height for the "second" waypoint.

In an embodiment, this algorithm has the advantages of being simple to implement and able to run in real time on an embedded computer onboard the UAV. In another embodiment, each radar return can be used to update a probabilistic map of the region by dividing the space into voxels and tracking the probability that each is occupied. This approach has been used successfully to generate maps of underwater caverns using sonar systems with similar beam properties to the proposed radar. This algorithm treats the mapping and trajectory processes separately and proceeds in five discrete steps. First, it used the vehicle's current navigation solution to estimate the path of the radar beam. Next, it uses a one dimensional Kalman filter (KF) to increase the probability of occupancy of cells in which a hit has been recorded, for example from a tree. Third, it uses the KF to decrease the probability of occupancy of cell through which the beam just past. Fourth, the generated map is used to determine an obstacle free path, for example by using a sampling based motion planner or other optimal trajectory generator, ultimately producing a path to the UAV's destination that avoids obstacles while respecting mission criteria and vehicle dynamic constraints. Finally, the generated map can be compared to digital terrain elevation data (DTED) maps and used to provide a global navigation reference in GPS-denied environments.

Both algorithms assume a navigation solution that can place each radar return in a unique voxel. However, it is also possible for navigation accuracy to be lost suddenly and unexpectedly for a variety of reasons, and thus an approach to terrain following that depends upon a global navigation fix cannot be relied upon at all times. As such, a reactive strategy for terrain avoidance can be used to enable terrain following flight without reference to a map. Embodiments of the present disclosure can use a strategy based on maintaining a flight path at a fixed angle above the lowest return at a selected critical range. In an embodiment, the only external information required for this algorithm is the direction of flight, which can be obtained from a magnetic compass onboard the UAV.

6. EXEMPLARY ADVANTAGES AND ALTERNATIVES

Embodiments of the present disclosure are well suited to MMW performance in cluttered environments and can incorporate both vehicle and sensor constraints. Embodiments of the present disclosure provide a significant increase in safe autonomous operation by allowing flight well below manned flight operations and in all weather. Embodiments of the present disclosure enable operators to plan flights near trees and ships in all weather (e.g., to support delivery of equipment or supplies without halting manned flight operations). By using MMW radar instead of visible light, as in stereo vision or monocular approaches to mapping, we are able to operate in all weather and without the range dependency of stereo vision or the range ambiguity of monocular techniques. MMW radar allows much greater range and angular precision than comparable sonar sensors, which are currently in wide use for altimetry in small UAVs. MMW radars do not suffer from the beam thinning of lidar systems, in which probability of detection of obstacles declines dramatically with range as the distance between lidar pencil beams grows. Embodiments of the present disclosure provide a clear military application as a component in manned/unmanned vehicle teams for disaster response, dismounted patrols, and automated logistics (i.e., delivery drones).

In an embodiment, the combined mapping and terrain following algorithm presented here could be replaced by separate mapping or simultaneous mapping and localization (SLAM) algorithm, while the course selection could be handled using sampling based motion planning algorithms that read the map as inputs and generate trajectories that meet criteria based on vehicle dynamic constraints, such as vertical acceleration, and safety constraints, such as minimum height over obstacles. However, each of these is computationally intensive and requires significant tuning for each combination of sensor, vehicle and environment. The proposed approach provides a straightforward means of extracting the salient data from a MMW sensor being used for altimetry and enabling autonomous flight over clutter.

7. CONCLUSION

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented as a computer program executing on a machine, as a computer program product, or as a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. An unmanned aerial vehicle (UAV), comprising:
a millimeter-wave (MMW) radar configured to send MMW radar signal and to receive corresponding MMW radar returns including a plurality of detections; and
an autonomous controller configured to:
reject a portion of the MMW radar returns as clutter;
project the detections over a two dimensional (2D) grid,
determine a plurality of maximum heights in areas of the 2D grid based on the detections, and
determine a plan for the UAV to avoid obstacles based on the determined plurality of maximum heights.

2. The UAV of claim 1, wherein the autonomous controller is further configured to:
determine respective validities of individual detections in the MMW radar returns.

3. The UAV of claim 1, wherein the autonomous controller is further configured to:
generate a flight path for the UAV based on the determined plan to avoid obstacles based on the determined maximum heights.

4. The UAV of claim 1, wherein the plurality of detections are constant false alarm rate (CFAR) detections.

5. The UAV of claim 1, wherein the UAV further comprises a flight controller, and wherein the autonomous controller is further configured to send instructions to the flight controller based on the determined plan to avoid obstacles.

6. The UAV of claim 5, wherein the autonomous controller is further configured to:
instruct the flight controller to maintain the UAV at a plurality of fixed heights above each maximum height in each area of the 2D grid.

7. The UAV of claim 6, wherein the autonomous controller is further configured to:

instruct the flight controller to move the UAV along a path connecting each fixed height above each maximum height in each area of the 2D grid.

8. The UAV of claim 5, wherein the autonomous controller is further configured to:
instruct the flight controller to spread an altitude climb of the UAV over two of the areas of the 2D grid in response to detecting a sudden change in terrain altitude.

9. A method, comprising:
sending, using millimeter-wave (MMW) radar of an unmanned aerial vehicle (UAV), a MMW signal;
receiving, using the MMW radar, MMW radar returns, including a plurality of detections, corresponding to the MMW radar signal;
rejecting a portion of the MMW radar returns as clutter;
projecting the detections over a two dimensional (2D) grid;
determining a plurality of maximum heights in areas of the 2D grid based on the detections; and
determining a plan for the UAV to avoid obstacles based on the determined plurality of maximum heights.

10. The method of claim 9, further comprising:
determining respective validities of individual detections in the MMW radar returns.

11. The method of claim 9, further comprising:
generating a flight path for the UAV based on the determined plan to avoid obstacles.

12. The method of claim 9, wherein the plurality of detections are constant false alarm rate (CFAR) detections.

13. The method of claim 9, further comprising:
sending instructions to a flight controller based on the determined plan to avoid obstacles.

14. The method of claim 9, further comprising:
maintaining the UAV at a plurality of fixed heights above each maximum height in each area of the 2D grid.

15. An unmanned aerial vehicle (UAV), comprising:
a millimeter-wave (MMW) radar configured to:
send MMW radar signal, and
receive corresponding MMW radar returns;
a flight controller; and
an autonomous controller configured to:
reject a portion of the MMW radar returns as clutter,
determine a plurality of detections in the plurality of MMW radar returns,
project the detections over a two dimensional (2D) grid,
determine a plurality of maximum heights in areas of the 2D grid based on the detections, and
instruct the flight controller to avoid obstacles based on the determined plurality of maximum heights.

16. The UAV of claim 15, wherein the autonomous controller is further configured to:
instruct the flight controller to maintain the UAV at a plurality of fixed heights above each maximum height in each area of the 2D grid.

17. The UAV of claim 16, wherein the autonomous controller is further configured to:
instruct the flight controller to move the UAV along a path connecting each fixed height above each maximum height in each area of the 2D grid.

18. The UAV of claim 15, wherein the autonomous controller is further configured to:
instruct the flight controller to spread an altitude climb of the UAV over two of the areas of the 2D grid in response to detecting a sudden change in terrain altitude.

19. The UAV of claim 15, wherein the autonomous controller is further configured to determine a plan for the UAV to avoid obstacles based on the determined plurality of maximum heights.

20. The UAV of claim 19, wherein the autonomous controller is further configured to generate a flight path for the UAV based on the determined plan to avoid obstacles based on the determined maximum heights.

* * * * *